United States Patent
Lin et al.

(10) Patent No.: US 9,341,509 B2
(45) Date of Patent: May 17, 2016

(54) FREQUENCY MODULATION CONTINUOUS WAVE RADAR LEVEL METER AND SIGNAL-TRACKING AND PHASE-LOCKING METHOD FOR THE SAME

(71) Applicant: Finetek Co., Ltd., New Taipei (TW)

(72) Inventors: I-Chu Lin, New Taipei (TW);
Shu-Chien Cheng, New Taipei (TW);
Yi-Yan Lee, New Taipei (TW);
Hui-Chih Hsu, New Taipei (TW);
Chao-Kai Cheng, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 416 days.

(21) Appl. No.: 13/958,975

(22) Filed: Aug. 5, 2013

(65) Prior Publication Data
US 2015/0035695 A1 Feb. 5, 2015

(51) Int. Cl.
*G01F 23/284* (2006.01)
*G01S 7/03* (2006.01)
*G01S 13/34* (2006.01)
*G01S 13/88* (2006.01)

(52) U.S. Cl.
CPC ............. *G01F 23/284* (2013.01); *G01S 7/03* (2013.01); *G01S 13/34* (2013.01); *G01S 13/88* (2013.01)

(58) Field of Classification Search
CPC ....... G01F 23/284; G01S 13/34; G01S 13/88; G01S 7/03; H01L 29/7881
USPC .......................................................... 342/124
See application file for complete search history.

(56) References Cited

U.S. PATENT DOCUMENTS

| | | | | |
|---|---|---|---|---|
| 4,737,788 A | * | 4/1988 | Kennedy | G01S 13/50 342/159 |
| 2005/0007271 A1 | * | 1/2005 | Isaji | G01S 7/35 342/70 |

* cited by examiner

*Primary Examiner* — Timothy A Brainard
(74) *Attorney, Agent, or Firm* — Muncy, Geissler, Olds & Lowe, P.C.

(57) ABSTRACT

An FMCW radar level meter has an RF signal processing module, an intermediate frequency (IF) signal processing module, and a computation and display module. A signal generator of the RF signal processing module generates a first RF signal, which is radiated by an antenna to a measured object. The antenna received a second RF signal reflected by the measured object. The IF signal processing module processes the second RF signal and compares the first RF signal with the second RF signal. The computation and display module calculates and displays a distance between the FMCW radar level meter and the measured object. Using the RF signal processing module and the IF signal processing module to process the second RF signal, the issues of noise and temperature coefficient shift can be resolved.

20 Claims, 5 Drawing Sheets

FREQUENCY MODULATION CONTINUOUS WAVE RADAR LEVEL METER AND SIGNAL-TRACKING AND PHASE-LOCKING METHOD FOR THE SAME

BACKGROUND OF THE INVENTION

1. Field of the Invention

The present invention relates to a frequency modulation continuous wave (FMCW) radar level meter, and, more particularly, to an FMCW radar level meter with signal-tracking and phase-locking functions.

2. Description of the Related Art

Precision technology has become one of the latest trends of industrial development. To instantly monitor level of liquid in a reservoir or perform measurement in an open space, such as river levels or dam levels, underground location of mineral deposit, and the like, FMCW radar level meters are developed to detect a distance to an object or a liquid level with electromagnetic wave (GHz level) radiated from antennae. A conventional FMCW radar level meter has a radio frequency (RF) transceiving circuit and an antenna, and is operated under an FMCW-based signal modulation method. Specifically, the FMCW radar level meter transmits a first signal and receives a second signal reflected from a measured object or liquid surface, and calculates the distance or a liquid level from the FMCW radar level meter to the object or the liquid surface with a frequency difference between the first and the second signals.

The RF transceiving circuit of the FMCW radar level meter generates a first radio-frequency signal from an oscillator. The first radio-frequency signal is radiated by the antenna to a measured object via a phase lock loop (PLL), and is reflected by the measured object to become a second radio-frequency signal. The antenna of the FMCW radar level meter receives the second radio-frequency signal, which is mixed with the first radio-frequency signal to obtain an intermediate-frequency (IF) signal. The IF signal is further used to calculate a distance between the FMCW radar level meter and the measured object.

As being compact in size and operated under high frequency, the oscillator, the PLL and a mixer in the RF transceiving circuit are easily affected by external noise interference and temperature change and are prone to noise generation and temperature coefficient shift.

SUMMARY OF THE INVENTION

An objective of the present invention is to provide an FMCW radar level meter and a signal-tracking and phase-locking method for the same immune to noise interference and temperature coefficient shift.

To achieve the foregoing objective, the frequency modulation continuous wave (FMCW) radar level meter has a radio frequency (RF) connector, an RF signal processing module, an intermediate frequency (IF) signal processing module, and a computation and display module.

The RF connector is adapted to connect to an external antenna.

The RF signal processing module has a signal generator, an active frequency multiplier, a signal coupler, a low-noise amplifier, a band pass filter, and a mixer.

The signal generator outputs a first RF signal.

The active frequency multiplier is electrically connected to the signal generator, and doubles the frequency of the first RF signal outputted from the signal generator.

The signal coupler has a local oscillator (LO) terminal, an RF terminal, a transmitting (TX) terminal, and a receiving (RX) terminal.

The LO terminal is connected to the RF connector.

The TX terminal is electrically connected to the active frequency multiplier, receives the frequency-doubled first RF signal, and further passes the frequency-doubled first RF signal to the LO terminal and the RF terminal for the RF terminal to transmit the frequency-doubled first RF signal and receive a second RF signal through the RF connector.

The RX terminal receives the second RF signal passed from the RF terminal.

The low-noise amplifier is electrically connected to the RX terminal of the signal coupler to receive and amplify the second RF signal transmitted from the RX terminal of the signal coupler.

The band pass filter is electrically connected to the low-noise amplifier to receive and filter the amplified second RF signal.

The mixer has an RX input terminal, an LO input terminal, and an IF output terminal.

The RX input terminal is electrically connected to the band pass filter to receive the amplified second RF signal.

The LO input terminal is electrically connected to the LO terminal of the signal coupler to receive the frequency-doubled first RF signal. The mixer processes a frequency difference of the frequency-doubled first RF signal and the amplified second RF signal, and converts the frequency difference into an IF signal for the IF output terminal to output the IF signal.

The IF signal processing module has a DC block, a twin-T notch filter, and a power amplifier.

The DC block is electrically connected to the IF output terminal of the mixer to receive the IF signal outputted from the IF output terminal and isolate DC signals in the IF signal.

The twin-T notch filter is electrically connected to the DC block to filter the IF signal and output a frequency band of the IF signal.

The power amplifier is electrically connected to the twin-T notch filter to amplify and output the frequency band of the IF signal.

The computation and display module has an analog-to-digital (A/D) converter, a microcontroller unit (MCU), and a display.

The A/D converter is electrically connected to the power amplifier to convert the frequency band of the IF signal into a digital signal and output the digital signal.

The MCU is electrically connected to the A/D converter to calculate a distance according to the digital signal.

The display is electrically connected to the MCU to display the distance thereon.

To achieve the foregoing objective, the signal-tracking and phase-locking method for an FMCW radar level meter has steps of:

transmitting a first radio frequency signal to a measured object, and receiving a second radio frequency signal with a different frequency reflected by the measured object;

after performing signal amplification and band pass filtering on the second radio frequency signal, mixing the first radio frequency signal with the second radio frequency signal to obtain an intermediate frequency signal according to a frequency difference between the first radio frequency signal and the second radio frequency signal; and after blocking DC signals in the intermediate frequency signal and performing power amplification on the intermediate frequency signal, calculating a distance between the FMCW radar level meter and the measured object based on the intermediate frequency signal.

Given the foregoing FMCW radar level meter, the signal generator of the RF signal processing module generates a first RF signal and transmits the first RF signal to the TX terminal of the signal coupler. The signal coupler then simultaneously passes the first RF signal to the LO terminal and the RF terminal. The first RF signal at the RF terminal of the signal coupler is radiated to the measured object by the antenna through the RF connector. The first RF signal is reflected by the measured object to become the second RF signal, which is received by the antenna. The second RF signal is transmitted from the RX terminal of the signal coupler to the low-noise amplifier and the band pass filter to filter noise and acquire a desired frequency band. The second RF signal with the desired frequency band is transmitted to the RX input terminal of the mixer for the mixer to convert a frequency difference between the first RF signal to the LO input terminal of the mixer and the second RF signal to the RX input terminal into an IF signal, which is outputted from the IF output terminal to the DC block to isolate DC signals therein. The twin-T notch filter acquires a selected frequency band in the IF signal, which is amplified by the power amplifier, is further transmitted to the A/D converter, and is converted into a digital signal by the A/D converter. The MCU calculates a distance represented by the digital signal and the display displays the distance thereon. The second RF signal and the IF signal are processed by the band pass filter of the RF signal processing module and the DC block of the IF signal processing module to resolve the issues of noise and temperature coefficient shift occurring in the conventional FMCW radar level meters.

Other objectives, advantages and novel features of the invention will become more apparent from the following detailed description when taken in conjunction with the accompanying drawings.

DETAILED DESCRIPTION OF THE INVENTION

Figure 1:
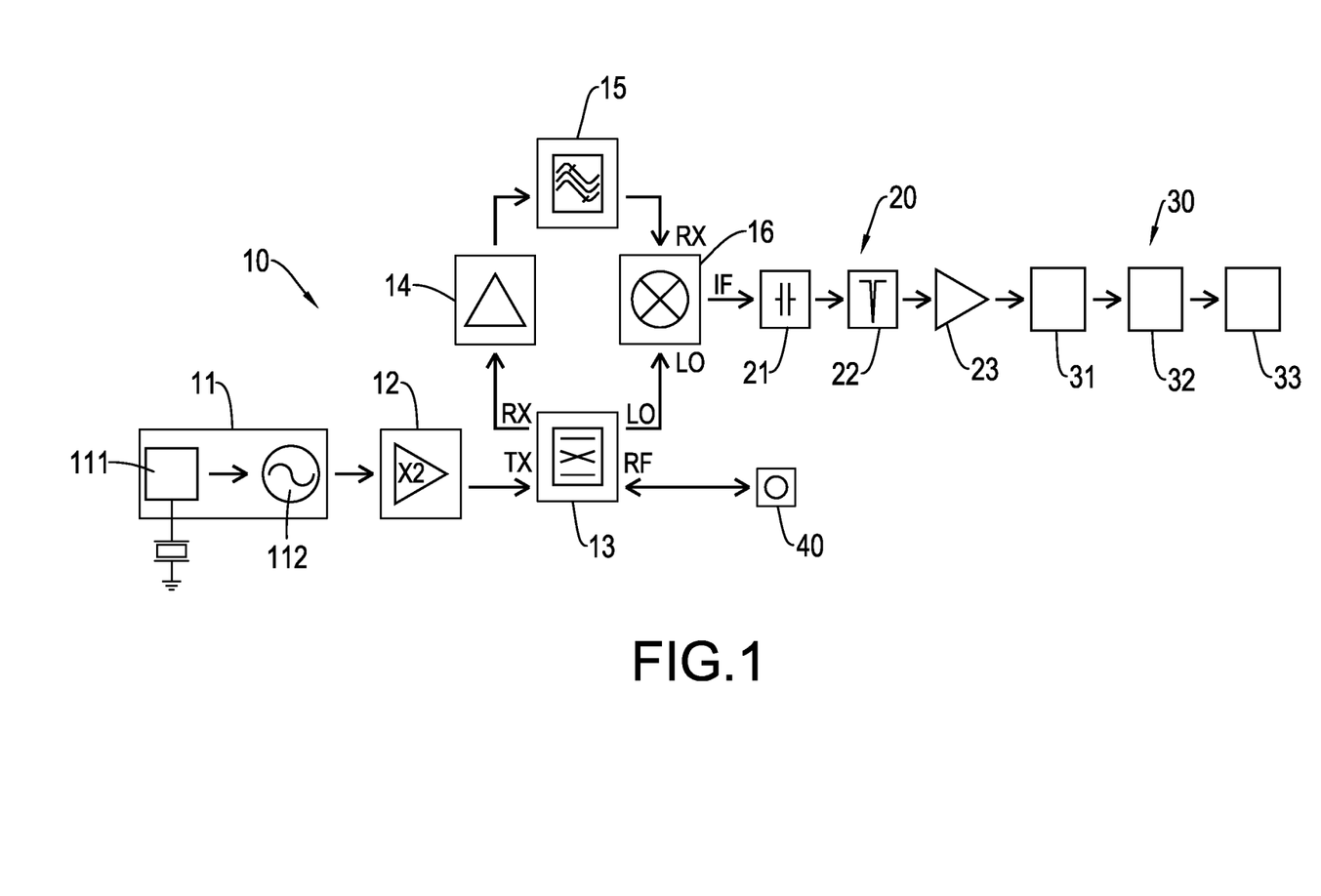
FIG. 1 is a functional block diagram of a first embodiment of an FMCW radar level meter in accordance with the present invention.

With reference to FIG. 1, a first embodiment of an FMCW radar level meter in accordance with the present invention has a radio frequency (RF) connector 40, an RF signal processing module 10, an IF signal processing module 20, and a computation and display module 30. The RF signal processing module 10, the IF signal processing module 20, and the computation and display module 30 are sequentially connected in series to one another.

The RF signal processing module 10 has a signal generator 11, an active frequency multiplier 12, a signal coupler 13, a low-noise amplifier 14, a band pass filter 15 and a mixer 16.

The signal generator 11 has an oscillator 111 and a PLL 112. The oscillator 111 may be a voltage-controlled oscillator or a temperature-controlled oscillator. The oscillator 111 and the PLL 112 enable the signal generator 11 to output a first radio-frequency signal, which may be a sawtooth wave or a sinusoidal wave with linear variation.

The active frequency multiplier 12 is electrically connected to the signal generator 11, and doubles the frequency of the first radio-frequency signal outputted from the signal generator 11.

The signal coupler 13 has a transmitting (TX) terminal, a receiving (RX) terminal, an RF terminal, and a local oscillator (LO) terminal. The TX terminal is electrically connected to the active frequency multiplier 12. The RF terminal is connected to the RF connector 40, which is further connected to an external antenna. The low-noise amplifier 14 is electrically connected to the RX terminal of the signal coupler 13. The band pass filter 15 is electrically connected to the low-noise amplifier 14. The mixer 16 has an RX input terminal, an LO input terminal, and an IF output terminal. The RX input terminal is electrically connected to the band pass filter 15. The LO input terminal of the mixer is electrically connected to the LO terminal of the signal coupler 13.

The signal coupler 13 transmits the frequency-doubled first radio-frequency signal to the RF connector 40 and the mixer 16, or transmits a second radio-frequency signal received by the RF connector 40 to the low-noise amplifier 14. The low-noise amplifier 14 amplifies the second radio-frequency signal and the band pass filter 15 then filters the amplified second radio-frequency signal. The mixer 16 serves to process a frequency difference between the first radio-frequency signal and the second radio-frequency signal.

The IF signal processing module 20 has a DC block 21, a twin-T notch filter 22, and a power amplifier 23. The DC block 21 is electrically connected to the IF output terminal of the mixer 16. The twin-T notch filter 22 is electrically connected to the DC block 21. The power amplifier 23 is electrically connected to the twin-T notch filter 22.

The computation and display module 30 has an analog-to-digital (A/D) converter 31, a microcontroller unit (MCU) 32, and a display 33. The A/D converter 31 is electrically connected to the power amplifier 23. The MCU 32 is electrically connected to the A/D converter 31. The display 33 is electrically connected to the MCU 32.

The operation of the FMCW radar level meter is described as follows. The signal generator 11 of the RF signal processing module 10 generates the first radio-frequency signal. The active frequency multiplier 12 doubles the first radio-frequency signal, and transmits the frequency-doubled first radio-frequency signal to the TX terminal of the signal coupler 13. The signal coupler 13 transmits the first radio-frequency signal to the LO final and the RF terminal. The first radio-frequency signal at the RF terminal is radiated by an antenna through the RF connector 40 to a measured object. After reaching the measured object, the first radio-frequency signal is reflected to become the second radio-frequency signal with a different frequency. The second radio-frequency signal is received by the antenna, is transmitted to the low-noise amplifier 14 through the RX terminal, and is filtered by the band pass filter 15 to obtain the filtered second radio-frequency signal within a specified frequency band. The filtered second radio-frequency signal is then transmitted to the RX input terminal of the mixer 16. The mixer 16 converts a frequency difference between the first radio-frequency signal received by the LO input terminal thereof and the filtered second radio-frequency signal received by the RX input terminal thereof into an IF signal. The IF signal is transmitted to the DC block 21 through the IF output terminal of the mixer 16 to isolate DC signals therein. The twin-T notch filter 22 acquired a selected frequency band of the IF signal. After being amplified by the power amplifier 23, the selected frequency band of the IF signal is transmitted to the A/D converter 31 and is converted by the A/D converter 31 into a digital signal. The MCU 32 calculates a distance based on the digital signal. The display 33 displays the distance thereon. Given the band pass filter 15, the DC block 21, and the twin-T notch filter 22, the noise contained in the second radio-frequency signal and the IF signal can be filtered and the temperature coefficient shift can be compensated. Accordingly, the issues of noise and temperature coefficient shift in the conventional FMCW radar level meter can be resolved.

Figure 2:
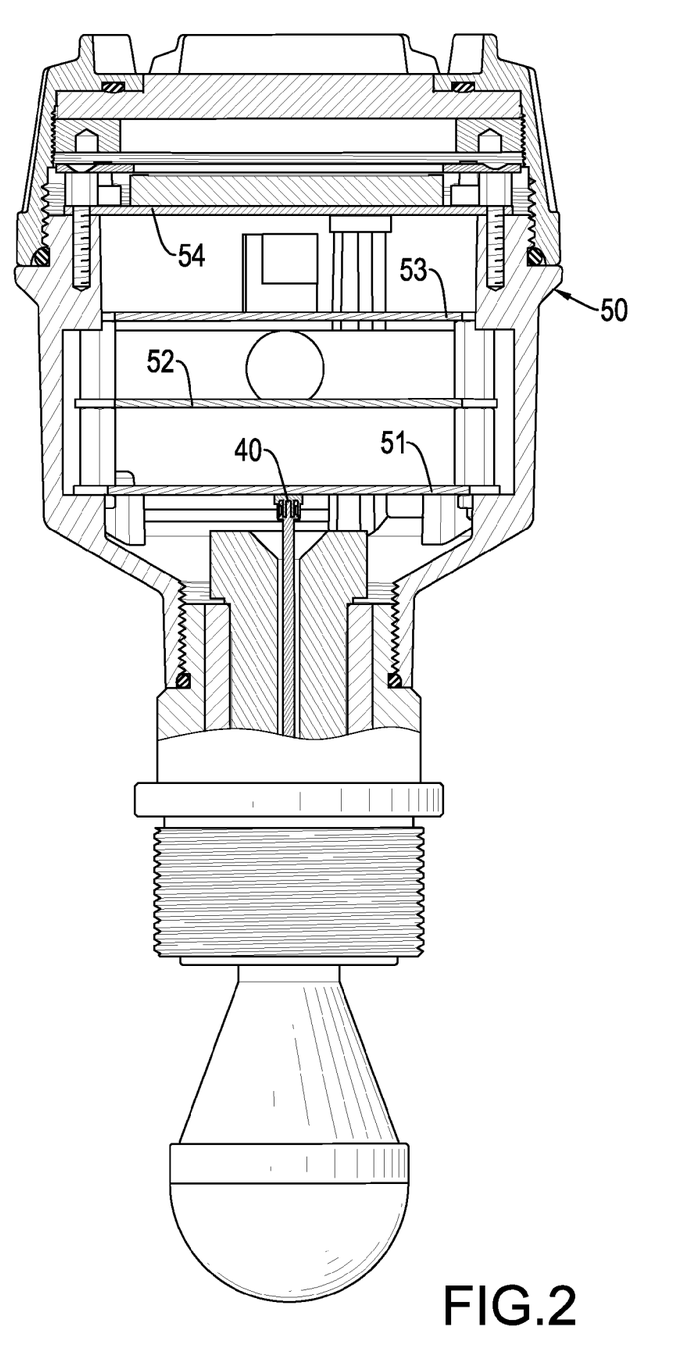
FIG. 2 is a front view in partial section of the FMCW radar level meter in FIG. 1.
Figure 3:
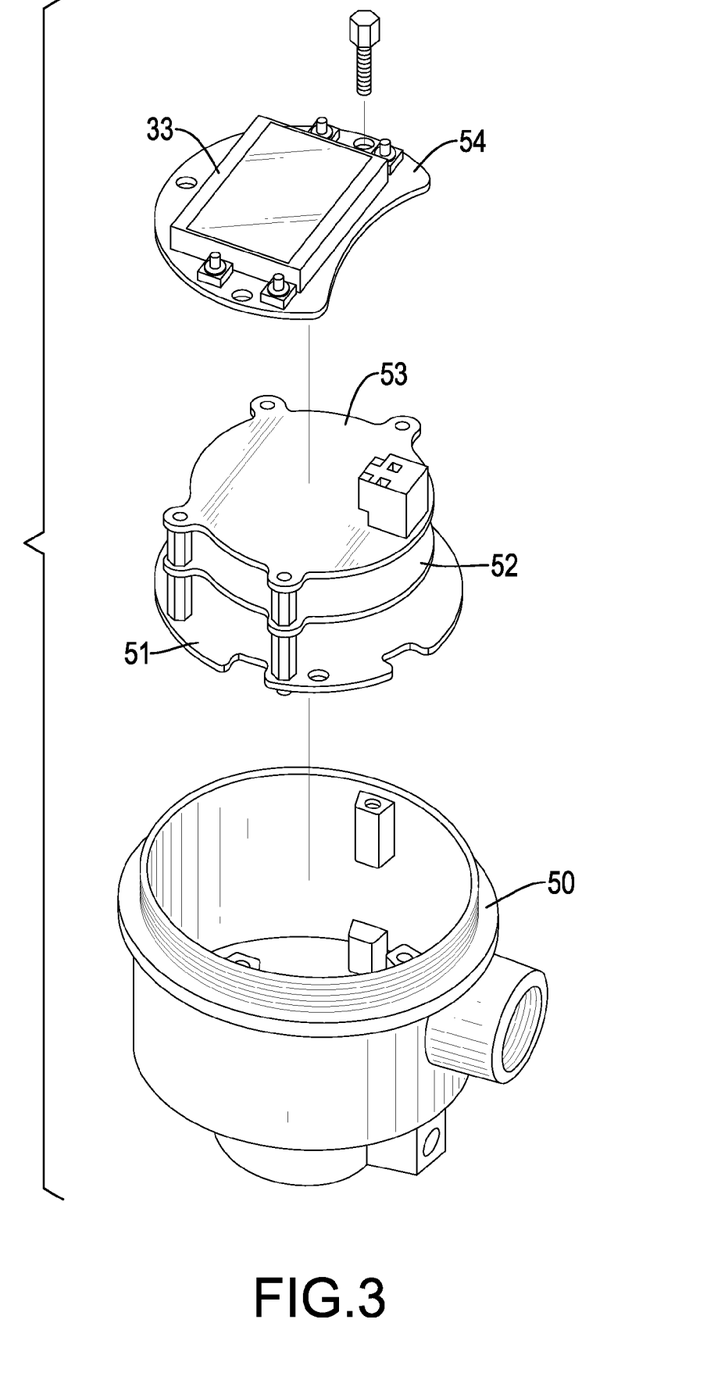
FIG. 3 is a partially exploded perspective view of the FMCW radar level meter in FIG. 1.

With reference to FIGS. 2 and 3, the FMCW radar level meter further has a body 50, an RF printed circuit board (PCB) 51, an MCU PCB 52, a power PCB 53, and a display PCB 54. The RF PCB 51, the MCU PCB 52, the power PCB 53, and the display PCB 54 are sequentially mounted inside the body 50. The RF PCB 51 has the RF signal processing module 10, the IF signal processing module 20, and the RF connector 40 mounted thereon. The MCU PCB 52 has the A/D converter 31 and the MCU of the computation and display module 30 mounted thereon. The power PCB 53 has a power circuit mounted thereon. The display PCB 54 has the display 33 of the computation and display module 30 mounted thereon. As the MCU PCB 52 is mounted between the RF PCB 51 and the power PCB 53, electromagnetic interference (EMI) radiated from the power PCB 53 can be shielded and reduced by the MCU PCB 52 to prevent the EMI from interfering with the IF signal of the RF PCB 51, and a shorter distance for a control signal to be sent from the MCU PCB 52 to the RF PCB 51 ensures a lower power consumption.

Figure 4:
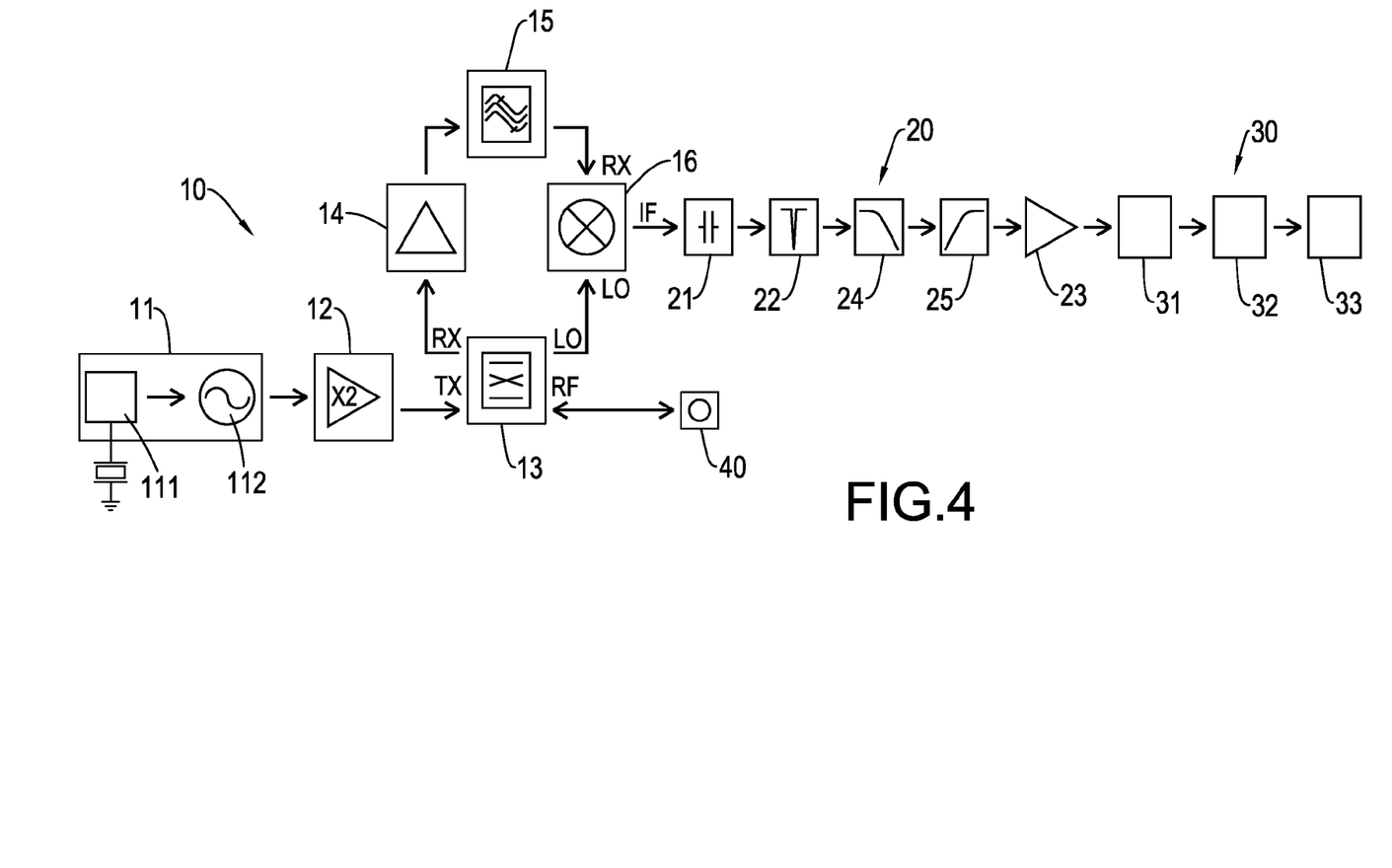
FIG. 4 is a functional block diagram of a second embodiment of an FMCW radar level meter in accordance with the present invention.

With reference to FIG. 4, a second embodiment of an FMCW radar level meter in accordance with the present invention differs from the foregoing embodiment in that the IF signal processing module 20 further has a low-frequency filter 24 and a high-frequency filter 25 connected in series to each other. The low-frequency filter 24 is electrically connected to the twin-T notch filter 22. The high-frequency filter 25 is electrically connected to the power amplifier 23. After the IF signal outputted from the two-T notch filter 22 is further transmitted to the low-frequency filter 24 and the high-frequency filter 25 to filter noise contained in the IF signal and compensate temperature coefficient, the issue of the second radio-frequency signal and the IF signal being vulnerable to external noise and temperature influence can be hence mitigated.

Figure 5:
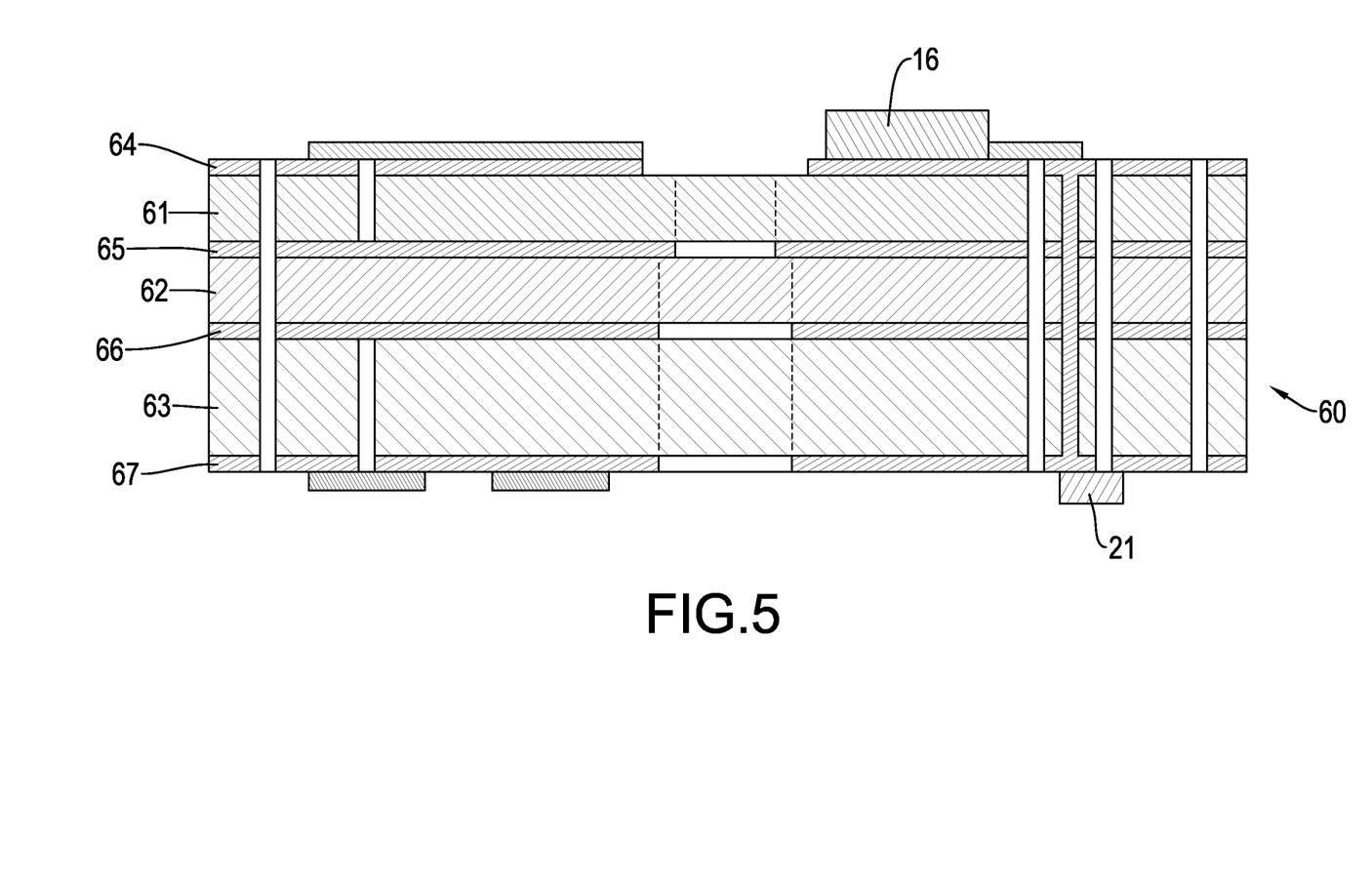
FIG. 5 is a cross-sectional view of an integrated circuit board of the FMCW radar level meter in FIG. 4.

With reference to FIG. 5, the present embodiment further has a multi-layer PCB 60. The multi-layer PCB 60 integrates the RF PCB 51, the MCU PCB 52, and the power PCB 53 on a same PCB. The multi-layer PCB 60 has a first core layer 61, a second core layer 62, a third core layer 63, an RF ground layer 65, an IF ground layer 66, and an IF power layer 67. The third core layer 63, the second core layer 62, and the first core layer 61 are sequentially stacked. The first core layer 61 has an RF component layer 64 formed thereon to connect to each element of the RF signal processing module 10, such as the mixer 16. The RF ground layer 65 is sandwiched between the first core layer 61 and the second core layer 62 for grounding each element of the RF signal processing module 10. The IF ground layer 66 is sandwiched between the second core layer 62 and the third core layer 63 for grounding each element of the IF signal processing module 20. The IF power layer 67 is formed on a bottom surface of the third core layer 63 to connect the power circuit and each element of the IF signal processing module 20, such as the DC block 21. Each of the RF component layer 64 and the IF power layer 67 has multiple micro-strips formed thereon. The elements on the first core layer 61 and on the third core layer 63, the micro-strips, the RF component layer 64, and the IF power layer 67 can be electrically connected by plated through holes or conductive vias.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A frequency modulation continuous wave (FMCW) radar level meter, comprising:
   a radio frequency (RF) connector adapted to connect to an external antenna;
   an RF signal processing module having:
      a signal generator outputting a first RF signal;
      an active frequency multiplier electrically connected to the signal generator, and doubling a frequency of the first RF signal outputted from the signal generator;
   a signal coupler having:
      a local oscillator (LO) terminal;
      an RF terminal connected to the RF connector;
      a transmitting (TX) terminal electrically connected to the active frequency multiplier, receiving the frequency-doubled first RF signal, and further passing the frequency-doubled first RF signal to the LO terminal and the RF terminal for the RF terminal to transmit the frequency-doubled first RF signal and receive a second RF signal through the RF connector; and
      a receiving (RX) terminal receiving the second RF signal passed from the RF terminal;
   a low-noise amplifier electrically connected to the RX terminal of the signal coupler to receive and amplify the second RF signal transmitted from the RX terminal of the signal coupler;
   a band pass filter electrically connected to the low-noise amplifier to receive and filter the amplified second RF signal; and
   a mixer having:
      an RX input terminal electrically connected to the band pass filter to receive the amplified second RF signal;
      an LO input terminal electrically connected to the LO terminal of the signal coupler to receive the frequency-doubled first RF signal; and
      an intermediate-frequency (IF) output terminal;
   wherein the mixer processes a frequency difference between the frequency-doubled first RF signal and the amplified second RF signal, and converts the frequency difference into an IF signal for the IF output terminal to output the IF signal;
   an IF signal processing module having:
      a DC block electrically connected to the IF output terminal of the mixer to receive the IF signal outputted from the IF output terminal and isolate DC signals in the IF signal;
      a twin-T notch filter electrically connected to the DC block to filter the IF signal and output a frequency band of the IF signal; and
      a power amplifier electrically connected to the twin-T notch filter to amplify and output the frequency band of the IF signal; and
   a computation and display module having:

an analog-to-digital (A/D) converter electrically connected to the power amplifier to convert the frequency band of the IF signal into a digital signal and output the digital signal;
a microcontroller unit (MCU) electrically connected to the A/D converter to calculate a distance according to the digital signal; and
a display electrically connected to the MCU to display the distance thereon.

2. The FMCW radar level meter as claimed in claim 1, wherein the IF signal processing module further has a low-frequency filter connected in series between the twin-T notch filter and the power amplifier.

3. The FMCW radar level meter as claimed in claim 2, wherein the IF signal processing module further has a high-frequency filter connected in series between the low-frequency filter and the power amplifier.

4. The FMCW radar level meter as claimed in claim 3, wherein the signal generator has an oscillator and a phase lock loop, and the oscillator is a voltage-controlled oscillator or a temperature-controlled oscillator.

5. The FMCW radar level meter as claimed in claim 4, wherein the first RF signal generated by the signal generator has the waveform of a sawtooth wave or a sinusoidal wave with linear variation.

6. The FMCW radar level meter as claimed in claim 5, further comprising:
a body;
an RF printed circuit board (PCB) having the RF signal processing module, the IF signal processing module, and the RF connector mounted thereon;
an MCU PCB having the A/D converter and the MCU of the computation and display module mounted thereon;
a power PCB having a power circuit mounted thereon; and
a display PCB having the display of the computation and display module mounted thereon;
wherein the RF PCB, the MCU PCB, the power PCB, and the display PCB are sequentially mounted inside the body, and the MCU PCB is sandwiched between the RF PCB and the power PCB.

7. The FMCW radar level meter as claimed in claim 6, further comprising a body having a multi-layer PCB mounted inside the body, wherein the multi-layer PCB has:
a third core layer, a second core layer, and a first core layer sequentially stacked;
an RF component layer formed on the first core layer to connect to the RF signal processing module;
an RF ground layer sandwiched between the first core layer and the second core layer;
an IF ground layer sandwiched between the second core layer and the third core layer; and
an IF power layer formed on a bottom surface of the third core layer to connect a power circuit and the IF signal processing module;
wherein each of the RF component layer and the IF power layer has multiple micro-strips formed thereon, and the first core layer, the third core layer, the micro-strips, the RF component layer, and the IF power layer are electrically connected by plated through holes or conductive vias.

8. The FMCW radar level meter as claimed in claim 5, further comprising a body having a multi-layer PCB mounted inside the body, wherein the multi-layer PCB has:
a third core layer, a second core layer, and a first core layer sequentially stacked;
an RF component layer formed on the first core layer to connect to the RF signal processing module;
an RF ground layer sandwiched between the first core layer and the second core layer;
an IF ground layer sandwiched between the second core layer and the third core layer; and
an IF power layer formed on a bottom surface of the third core layer to connect a power circuit and the IF signal processing module;
wherein each of the RF component layer and the IF power layer has multiple micro-strips formed thereon, and the first core layer, the third core layer, the micro-strips, the RF component layer, and the IF power layer are electrically connected by plated through holes or conductive vias.

9. The FMCW radar level meter as claimed in claim 4, further comprising:
a body;
an RF printed circuit board (PCB) having the RF signal processing module, the IF signal processing module, and the RF connector mounted thereon;
an MCU PCB having the A/D converter and the MCU of the computation and display module mounted thereon;
a power PCB having a power circuit mounted thereon; and
a display PCB having the display of the computation and display module mounted thereon;
wherein the RF PCB, the MCU PCB, the power PCB, and the display PCB are sequentially mounted inside the body, and the MCU PCB is sandwiched between the RF PCB and the power PCB.

10. The FMCW radar level meter as claimed in claim 9, further comprising a body having a multi-layer PCB mounted inside the body, wherein the multi-layer PCB has:
a third core layer, a second core layer, and a first core layer sequentially stacked;
an RF component layer formed on the first core layer to connect to the RF signal processing module;
an RF ground layer sandwiched between the first core layer and the second core layer;
an IF ground layer sandwiched between the second core layer and the third core layer; and
an IF power layer formed on a bottom surface of the third core layer to connect a power circuit and the IF signal processing module;
wherein each of the RF component layer and the IF power layer has multiple micro-strips formed thereon, and the first core layer, the third core layer, the micro-strips, the RF component layer, and the IF power layer are electrically connected by plated through holes or conductive vias.

11. The FMCW radar level meter as claimed in claim 4, further comprising a body having a multi-layer PCB mounted inside the body, wherein the multi-layer PCB has:
a third core layer, a second core layer, and a first core layer sequentially stacked;
an RF component layer formed on the first core layer to connect to the RF signal processing module;
an RF ground layer sandwiched between the first core layer and the second core layer;
an IF ground layer sandwiched between the second core layer and the third core layer; and
an IF power layer formed on a bottom surface of the third core layer to connect a power circuit and the IF signal processing module;
wherein each of the RF component layer and the IF power layer has multiple micro-strips formed thereon, and the first core layer, the third core layer, the micro-strips, the RF component layer, and the IF power layer are electrically connected by plated through holes or conductive vias.

12. The FMCW radar level meter as claimed in claim 3, further comprising:
   a body;
   an RF printed circuit board (PCB) having the RF signal processing module, the IF signal processing module, and the RF connector mounted thereon;
   an MCU PCB having the A/D converter and the MCU of the computation and display module mounted thereon;
   a power PCB having a power circuit mounted thereon; and
   a display PCB having the display of the computation and display module mounted thereon;
   wherein the RF PCB, the MCU PCB, the power PCB, and the display PCB are sequentially mounted inside the body, and the MCU PCB is sandwiched between the RF PCB and the power PCB.

13. The FMCW radar level meter as claimed in claim 12, further comprising a body having a multi-layer PCB mounted inside the body, wherein the multi-layer PCB has:
   a third core layer, a second core layer, and a first core layer sequentially stacked;
   an RF component layer formed on the first core layer to connect to the RF signal processing module;
   an RF ground layer sandwiched between the first core layer and the second core layer;
   an IF ground layer sandwiched between the second core layer and the third core layer; and
   an IF power layer formed on a bottom surface of the third core layer to connect a power circuit and the IF signal processing module;
   wherein each of the RF component layer and the IF power layer has multiple micro-strips formed thereon, and the first core layer, the third core layer, the micro-strips, the RF component layer, and the IF power layer are electrically connected by plated through holes or conductive vias.

14. The FMCW radar level meter as claimed in claim 3, further comprising a body having a multi-layer PCB mounted inside the body, wherein the multi-layer PCB has:
   a third core layer, a second core layer, and a first core layer sequentially stacked;
   an RF component layer formed on the first core layer to connect to the RF signal processing module;
   an RF ground layer sandwiched between the first core layer and the second core layer;
   an IF ground layer sandwiched between the second core layer and the third core layer; and
   an IF power layer formed on a bottom surface of the third core layer to connect a power circuit and the IF signal processing module;
   wherein each of the RF component layer and the IF power layer has multiple micro-strips formed thereon, and the first core layer, the third core layer, the micro-strips, the RF component layer, and the IF power layer are electrically connected by plated through holes or conductive vias.

15. The FMCW radar level meter as claimed it claim 2, further comprising:
   a body;
   an RF printed circuit board (PCB) having the RF signal processing module, the IF signal processing module, and the RF connector mounted thereon;
   an MCU PCB having the A/D converter and the MCU of the computation and display module mounted thereon;
   a power PCB having a power circuit mounted thereon; and
   a display PCB having the display of the computation and display module mounted thereon;
   wherein the RF PCB, the MCU PCB, the power PCB, and the display PCB are sequentially mounted inside the body, and the MCU PCB is sandwiched between the RF PCB and the power PCB.

16. The FMCW radar level meter as claimed in claim 15, further comprising a body having a multi-layer PCB mounted inside the body, wherein the multi-layer PCB has:
   a third core layer, a second core layer, and a first core layer sequentially stacked;
   an RF component layer formed on the first core layer to connect to the RF signal processing module;
   an RF ground layer sandwiched between the first core layer and the second core layer;
   an IF ground layer sandwiched between the second core layer and the third core layer; and
   an IF power layer formed on a bottom surface of the third core layer to connect a power circuit and the IF signal processing module;
   wherein each of the RF component layer and the IF power layer has multiple micro-strips formed thereon, and the first core layer, the third core layer, the micro-strips, the RF component layer, and the IF power layer are electrically connected by plated through holes or conductive vias.

17. The FMCW radar level meter as claimed in claim 2, further comprising a body having a multi-layer PCB mounted inside the body, wherein the multi-layer PCB has:
   a third core layer, a second core layer, and a first core layer sequentially stacked;
   an RF component layer formed on the first core layer to connect to the RF signal processing module;
   an RF ground layer sandwiched between the first core layer and the second core layer;
   an IF ground layer sandwiched between the second core layer and the third core layer; and
   an IF power layer formed on a bottom surface of the third core layer to connect a power circuit and the IF signal processing module;
   wherein each of the RE component layer and the IF power layer has multiple micro-strips formed thereon, and the first core layer, the third core layer, the micro-strips, the RF component layer, and the IF power layer are electrically connected by plated through holes or conductive vias.

18. The FMCW radar level meter as claimed in claim 1, further comprising:
   a body;
   an RF printed circuit board (PCB) having the RF signal processing module, the IF signal processing module, and the RF connector mounted thereon;
   an MCU PCB having the A/D converter and the MCU of the computation and display module mounted thereon;
   a power PCB having a power circuit mounted thereon; and
   a display PCB having the display of the computation and display module mounted thereon;
   wherein the RF PCB, the MCU PCB, the power PCB, and the display PCB are sequentially mounted inside the body, and the MCU PCB is sandwiched between the RF PCB and the power PCB.

19. The FMCW radar level meter as claimed in claim 18, further comprising a body having a multi-layer PCB mounted inside the body, wherein the multi-layer PCB has:
   a third core layer, a second core layer, and a first core layer sequentially stacked;

an RF component layer formed on the first core layer to connect to the RF signal processing module;

an RF ground layer sandwiched between the first core layer and the second core layer;

an IF ground layer sandwiched between the second core layer and the third core layer; and an IF power layer firmed on a bottom surface of the third core layer to connect a power circuit and the IF signal processing module;

wherein each of the RF component layer and the IF power layer has multiple micro-strips formed thereon, and the first core layer, the third core layer, the micro-strips, the RF component layer, and the IF power layer are electrically connected by plated through holes or conductive vias.

20. The FMCW radar level meter as claimed in claim 1, further comprising a body having a multi-layer PCB mounted inside the body, wherein the multi-layer PCB has:

a third core layer, a second core layer, and a first core layer sequentially stacked;

an RF component layer formed on the first core layer to connect to the RF signal processing module;

an RF ground layer sandwiched between the first core layer and the second core layer;

an IF ground layer sandwiched between the second core layer and the third core layer; and an IF power layer formed on a bottom surface of the third core layer to connect a power circuit and the IF signal processing module;

wherein each of the RF component layer and the IF power layer has multiple micro-strips formed thereon, and the first core layer, the third core layer, the micro-strips, the RF component layer, and the IF power layer are electrically connected by plated through holes or conductive vias.

* * * * *